July 10, 1923.
H. W. AVERY
PIPE THREAD PROTECTOR
Filed Oct. 13, 1921
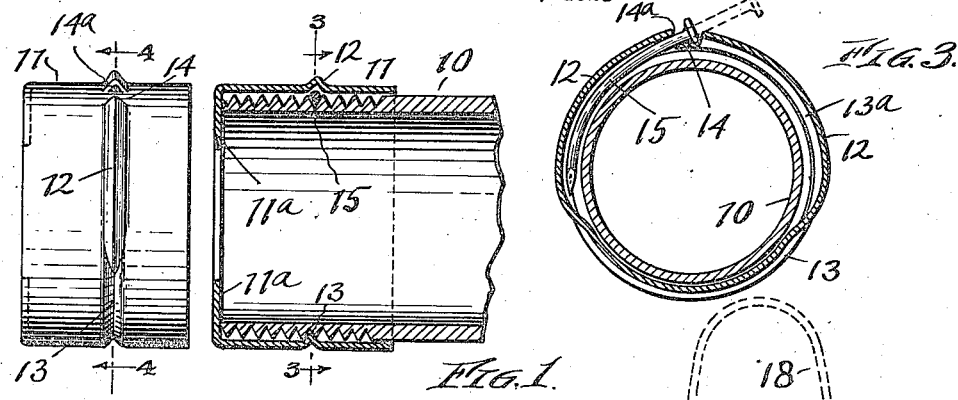
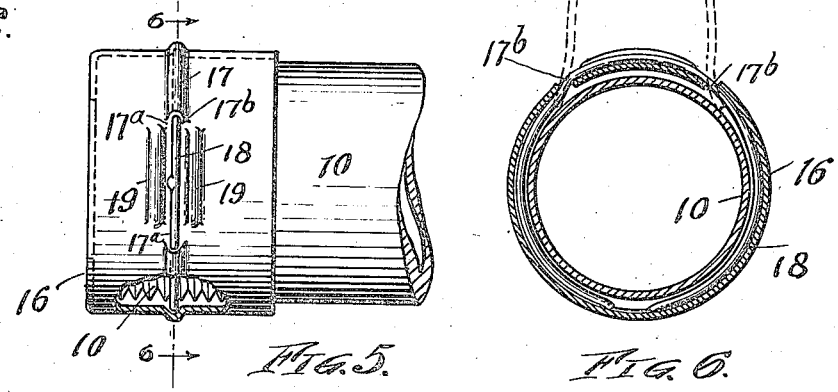
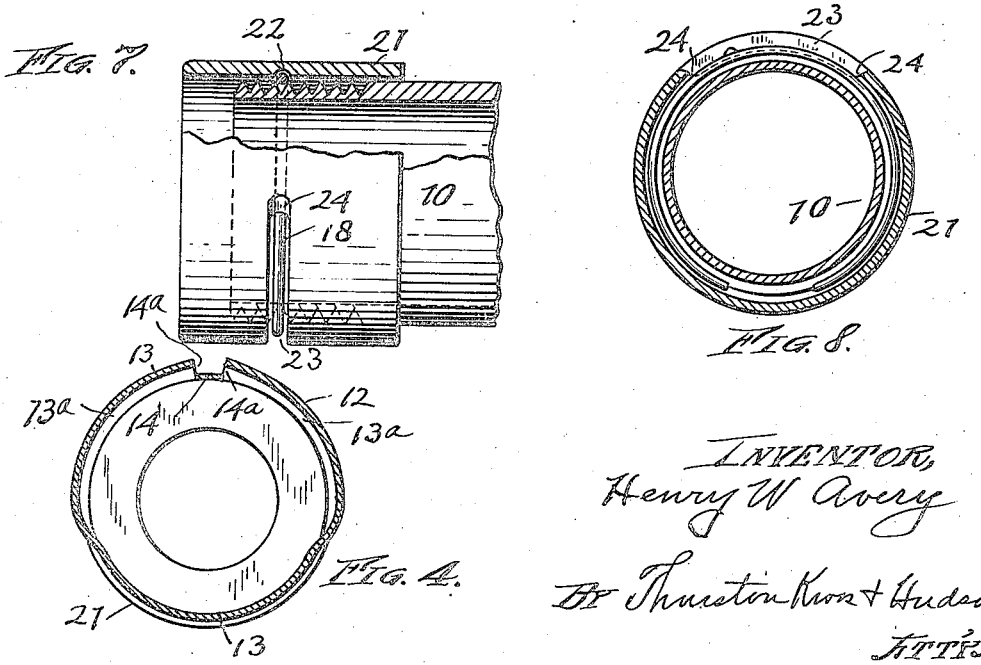
INVENTOR,
Henry W Avery
By Thurston Knox & Hudson
ATTYS Patented July 10, 1923.

1,461,595

UNITED STATES PATENT OFFICE.

HENRY W. AVERY, OF CLEVELAND, OHIO.

PIPE-THREAD PROTECTOR.

Application filed October 13, 1921. Serial No. 507,481.

*To all whom it may concern:*

Be it known that I, HENRY W. AVERY, a citizen of the United States, residing at Cleveland, in the county of Cuyahoga and State of Ohio, have invented a certain new and useful Improvement in Pipe-Thread Protectors, of which the following is a full, clear, and exact description.

In the loading and unloading and other handling of pipes whose ends are externally threaded, the threads are liable to be damaged unless protected. The object of this invention is to provide a thread protector for such pipes which is relatively inexpensive, and which may be easily and quickly applied and removed.

The invention consists in the construction and combination of parts shown in the drawing and hereinafter described and pointed out definitely in the appended claims.

In the drawing, Fig. 1 is a central longitudinal sectional view of a threaded pipe and a protector thereon embodying the preferred form of the present invention; Fig. 2 is an elevation of the protector of Fig. 1; Fig. 3 is a vertical transverse section in the plane of line 3—3 of Fig. 1; Fig. 4 is a sectional view of the protector as shown in Figs. 1, 2 and 3, omitting the pipe and holding nail; Fig. 5 is a view partly sectional, of a modified form of the protector embracing the pipe; Fig. 6 is a transverse sectional view of the same in the plane of line 6—6 of Fig. 5; and Figs 7 and 8 are views similar to Figs. 5 and 6, showing a further modification.

Referring to the parts by reference characters, 10 represents a pipe whose threaded end is to be protected. This protection is brought about by a sleeve 11, which is preferably formed of sheet metal, but may be formed of other material. This sleeve which is designed to surround the threaded part of the pipe is open at the end, being preferably provided with an inturned flange 11ª designed to fit against the end of the pipe, this flange forming an opening to provide means whereby one handling the pipe can insert a bar or hook, i. e. to facilitate its handling. The size of the sleeve 11 compared with the threaded end of the pipe is such that the sleeve can be readily slipped over the threads.

In accordance with my invention in its preferred form, illustrated in Figs. 1 to 4, and produced from the preferred material, namely, sheet metal, the sleeve is provided with an external or outwardly bent rib 12 extending part way around the sleeve, this rib or protuberance forming an internal groove 13ª. Additionally the sleeve is provided preferably substantially in the plane of the rib or protuberance 12, and extending between the ends thereof, with an internal rib or protuberance 13. The external and internal ribs 12 and 13 preferably extend spirally around the sleeve and run parallel to, or follow the pitch of the thread for a purpose to be explained. At a point about the middle of the external groove or protuberance there is a lowered or relatively depressed portion 14, located between oppositely facing openings or entrance holes 14ª for the two halves of the internal groove 13ª which is interrupted by the lowered or relatively depressed part 14 forming in effect two internal grooves. This is clearly illustrated in Fig. 4.

In the use of this device the sleeve is slipped onto the threaded end of the pipe, and then a suitable locking device 15 which will function as a key is inserted in one of the openings 14ª, and driven part way around in the groove 13ª so that it will lie partly in one of the thread grooves of the pipe. By driving in this device the part of the sleeve opposite to the point of entrance of the device, namely, the internal rib or protuberance is pulled up into the thread groove of the pipe so that the sleeve becomes locked both by the fastening device which is thus driven in, and by the internal rib or protuberance 13. The sleeve is now held against slipping off the pipe, and in fact, it cannot be taken off unless the device is pulled out, or unless the sleeve is screwed off the pipe.

The locking device 15, referred to, will generally consist of a wire nail, although other devices could be used, such as a suitable piece of wire, or even a strip of wood. In fact, anything which can be driven into the groove 13ª and which forms the equivalent of a wedge or key to tighten the sleeve on the pipe in the manner just explained, can be used.

The device described above can be modified in certain minor particulars without destroying its effectiveness or altering its principle of operation. For example, instead of a single internal rib or protuberance 13

I may employ a plurality of them, the spacing of which can, if desired, correspond to the pitch of the thread, in which event all of them will be pulled into the thread grooves of the pipe. Or instead of having one or more continuous internal ribs it may have circumferentially separated or spaced inner projections.

In Figs. 5 and 6, the sleeve which is here designated 16, is provided with an external rib or protuberance 17, forming an internal groove which extends spirally parallel with the pitch of the thread, almost entirely around the sleeve. This external rib 17 is interrupted at one or more points, indicated at 17$^a$, forming openings 17$^b$ for the insertion in the internal groove of the key, wedge, or holding device which is employed. In this event, the internal protuberance or protuberances corresponding to the internal rib 13 is dispensed with, and the locking of the sleeve depends upon the holding device or devices entirely, which act as keys to hold the sleeve in place. The number of the interrupted points 17 and pairs of openings leading to the internal groove that are employed, and therefore the number of holding devices necessary to be used as keys to hold the sleeve securely in place will depend upon the size of the pipe, several being employed for the larger sizes of pipe.

In this instance the holding device or key is in the form of a piece of wire 18, which is inserted in both openings 17$^b$ or ends of the internal groove, although one or more wire nails or equivalent devices could be utilized, as explained in connection with Figs. 1 to 4.

In order to insure that the wire or nail, or equivalent device will not be accidentally pulled out during the handling of the pipe, two outwardly pressed bosses or lugs 19 are formed on the sleeve in the interrupted space between and on opposite sides of the holes 17$^b$ or ends of the internal groove.

In Figs. 7 and 8 I have shown a modification wherein the protector or sleeve 21 may be formed from cast or wrought metal. This sleeve is provided on its inner periphery with a spiral groove 22 extending part way around the sleeve, which groove may be either machined or cast in the sleeve. Likewise, the sleeve is provided with a peripheral arc-shaped cut-away portion 23, extending a short distance around the sleeve forming openings 24 leading into the groove 22. This sleeve is locked and held onto the threaded end of the pipe in precisely the manner previously described, i. e. by means of a wire nail, a wire, or a plurality of them, or any other suitable device which may be expedient.

With the protector described above, and several forms of which are illustrated, the threaded end of the pipe is thoroughly protected against damage. The protector can be applied very readily, and it can be as readily removed. It is inexpensive to manufacture, as well as to apply. In view of these decided advantages it will be apparent that I have provided an improvement of considerable merit in thread protectors.

While I have shown several modifications of my invention, I do not desire to be confined to the precise details or arrangements shown, but aim in my claims to cover all modifications which do not involve a departure from the spirit and scope of the invention as set forth in the appended claims.

Having described my invention, I claim:

1. A pipe thread protector comprising a sleeve having an internal groove extending part way around it and having an opening communicating with said groove, and a locking key which lies partly in said groove, the diameter of said key being greater than the depth of the groove whereby the key will project into one of the spiral grooves of a threaded pipe upon which the sleeve is fitted.

2. A pipe thread protector comprising a sleeve having two spaced apart holes and having an internal groove which extends in opposite directions from said holes, and a locking key which extends from a point outside of the sleeve between said holes and which passes through one of said holes and lies partly in said internal groove, whereby it will lie partly in the thread groove of the pipe to which the sleeve is fitted.

3. A pipe thread protector comprising a sleeve adapted to surround the threaded end of a pipe, said sleeve having an internal groove with an opening leading to the exterior of the sleeve so that a locking key may be inserted through said opening in the groove, and an internal projection adapted to be pulled up into the thread groove of the pipe on the insertion of a locking key in the groove.

4. A thread protector for a pipe comprising a sleeve having an internal groove and having an opening by which one end of the groove communicates with the exterior of the sleeve, and said sleeve having substantially opposite said opening an internal protuberance adapted to be pulled up into a thread groove of the pipe when a locking key is inserted through said opening into the groove.

5. A protector for the threaded end of a pipe comprising a sleeve having an external rib extending part way around the sleeve forming an internal groove, there being an opening in the pipe communicating with the groove, and said sleeve having substantially opposite said opening an internal rib or projection adapted to be pulled into the thread groove of the pipe onto which the sleeve is fitted when a locking key is inserted through said opening into the internal groove.

6. The combination of a pipe which is externally threaded at one end, a thread protecting sleeve which fits loosely over said threaded end of the pipe,—said sleeve having an internal groove which extends part way around it, and a hole communicating with said groove, and a locking key which lies partly in said groove and partly in one of the spiral thread grooves of the pipe, and which extends through said hole in the sleeve and lies partly outside of said sleeve.

In testimony whereof, I hereunto affix my signature.

HENRY W. AVERY.